(12) United States Patent
Nishikawa

(10) Patent No.: US 8,511,818 B2
(45) Date of Patent: Aug. 20, 2013

(54) MULTIFUNCTION PERIPHERAL HAVING OPENING AND CLOSING MECHANISM

(75) Inventor: Yasuo Nishikawa, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 120 days.

(21) Appl. No.: 13/041,465

(22) Filed: Mar. 7, 2011

(65) Prior Publication Data
US 2011/0234733 A1 Sep. 29, 2011

(30) Foreign Application Priority Data

Mar. 26, 2010 (JP) ................................. 2010-071868

(51) Int. Cl.
*B41J 29/13* (2006.01)

(52) U.S. Cl.
USPC .......................................... 347/108; 347/109

(58) Field of Classification Search
USPC ................. 347/108, 1–3, 107, 109; 399/125, 399/107, 110, 126; 400/691, 693
IPC ........................................................ B41J 29/13
See application file for complete search history.

(56) References Cited

U.S. PATENT DOCUMENTS

| 5,860,044 | A | 1/1999 | Eki et al. | |
|---|---|---|---|---|
| 7,293,870 | B2 * | 11/2007 | Yu | 347/108 |
| 7,369,794 | B2 | 5/2008 | Kawai et al. | |
| 7,440,712 | B2 * | 10/2008 | Uchida | 399/107 |
| 2006/0029424 | A1 | 2/2006 | Kawai et al. | |
| 2007/0196128 | A1 * | 8/2007 | Ishihara et al. | 399/125 |
| 2007/0252885 | A1 * | 11/2007 | Zhao | 347/108 |
| 2007/0292159 | A1 * | 12/2007 | Iijima | 399/110 |
| 2008/0049068 | A1 * | 2/2008 | Saito et al. | 347/37 |
| 2009/0022516 | A1 * | 1/2009 | Ohta et al. | 399/126 |
| 2009/0300878 | A1 * | 12/2009 | Suzuki | 16/71 |

FOREIGN PATENT DOCUMENTS

| JP | 05-224472 | 9/1993 |
|---|---|---|
| JP | 05-323686 | 12/1993 |
| JP | 10-143044 | 5/1998 |
| JP | 2006-044061 | 2/2006 |

\* cited by examiner

*Primary Examiner* — Manish S Shah
*Assistant Examiner* — Roger W Pisha, II
(74) *Attorney, Agent, or Firm* — Banner & Witcoff, Ltd.

(57) ABSTRACT

A multifunctional peripheral includes a main body, an upper unit arranged on the main body, and an opening and closing mechanism connected to the upper unit and the main body. The multifunctional peripheral further includes a damping unit including an engaging member configured to move in a predetermined direction and a spring configured to resiliently urge the engaging member in a direction opposite to the predetermined direction. During sliding of a slider from the first position to the second position, the slider engages the engaging member at an engaging position on a sliding path, moves the engaging member in the predetermined direction as the slider slides toward the second position, and disengages the engaging member at a disengaging position between the engaging position and the second position such that the slider is released from receiving the force of the spring via the engaging member when in the second position.

15 Claims, 10 Drawing Sheets

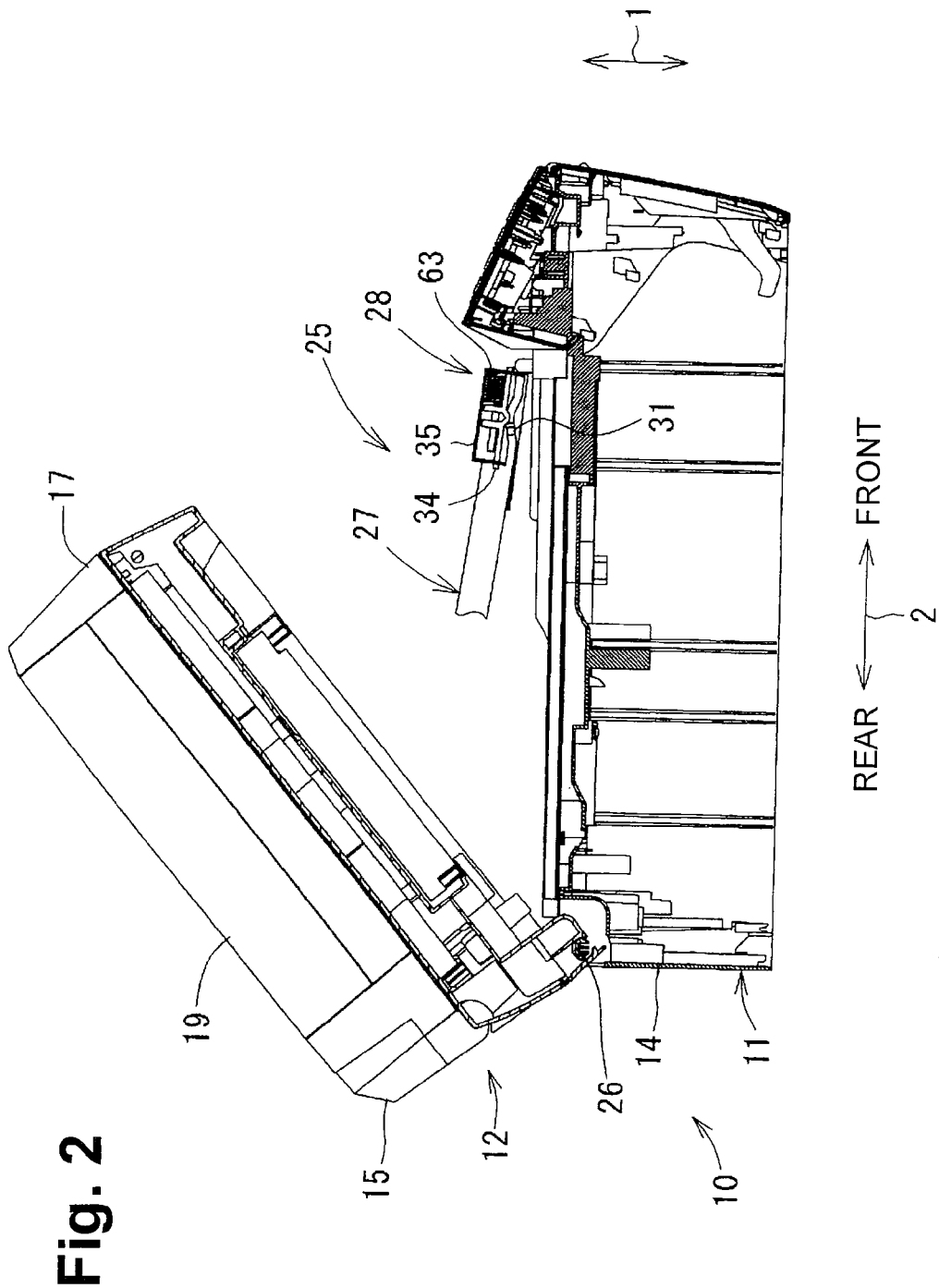

MULTIFUNCTION PERIPHERAL HAVING OPENING AND CLOSING MECHANISM

CROSS REFERENCE TO RELATED APPLICATION

The present application claims priority from Japanese Patent Application No. 2010-071868, filed on Mar. 26, 2010, the disclosure of which is incorporated herein by reference in its entirely.

BACKGROUND

1. Technical Field

The present invention relates to a multifunctional peripheral including a main body and an upper unit arranged on the main body.

2. Related Art

A multifunctional peripheral including a main body and an upper unit configured to be openable and closable with respect to the main body is well-known. The upper unit rotates about a predetermined axis with respect to the main body, and is displaced between a closed position in which an upper surface of the main body is covered and an open position in which the upper surface is released.

The multifunctional peripheral may include a supporting member (also referred to as a stand or the like) that supports the upper unit so as to hold the open position of the upper unit. The supporting member maintains the upper unit in the open position without being supported by an operator. The multifunctional peripheral may further include a damper mechanism for reducing impact applied to the main body when the upper unit is closed.

The above-described known damper mechanism is configured to apply a spring force to the upper unit according to the position of the upper unit with respect to the main body, and a maximum spring force acts on the upper unit when the upper unit takes the closed position. However, with the mechanism as described above, since the spring force always acts on the upper unit, the damper mechanism is required to have a sufficient life time, and hence a problem of increase in manufacturing cost may occur.

SUMMARY

A need has arisen to provide a multifunctional peripheral which realizes smooth opening and closing operation of an upper unit while realizing damping when being closed with respect to a main body, and which has a compact and less expensive opening and closing mechanism.

According to an embodiment of the invention, a multifunctional peripheral includes a main body and an upper unit arranged on the main body. The multifunctional peripheral further includes an opening and closing mechanism connected to the upper unit and the main body. The upper unit moves between a closed position covering an upper surface of the main body and an open position exposing the upper surface of the main body. The multifunctional peripheral still further includes a damping unit including an engaging member configured to move in a predetermined direction and including a spring configured to resiliently urge the engaging member in a direction opposite to the predetermined direction by a force corresponding to a sliding amount of the engaging member in the predetermined direction. During a sliding of the slider from the first position to the second position in accordance with a closing operation of the upper unit with respect to the main body, the slider engages the engaging member at an engaging position on the sliding path and moves the engaging member in the predetermined direction as the slider slides toward the second position, and the slider disengages the engaging member at a disengaging position between the engaging position and the second position such that the slider is released from receiving the force of the spring via the engaging member when the slider is in the second position.

BRIEF DESCRIPTION OF THE DRAWINGS

For a more complete understanding of the present invention, the needs satisfied thereby, and the features and advantages thereof, reference now is made to the following descriptions taken in connection with the accompanying drawings wherein:

FIG. 2 is a side view of the multifunctional peripheral 10;

DESCRIPTION OF PREFERRED EMBODIMENTS

Embodiments of the invention and their features and advantages may be understood by referring to FIGS. 1-10, like numerals being used for like corresponding parts in the various drawings. In the description given below, an entire configuration of a multifunctional peripheral in brief first, and then characteristic portions of the invention will be described in detail.

[General Configuration and Characteristic Points of Multifunctional Peripheral]

Figure 1A:
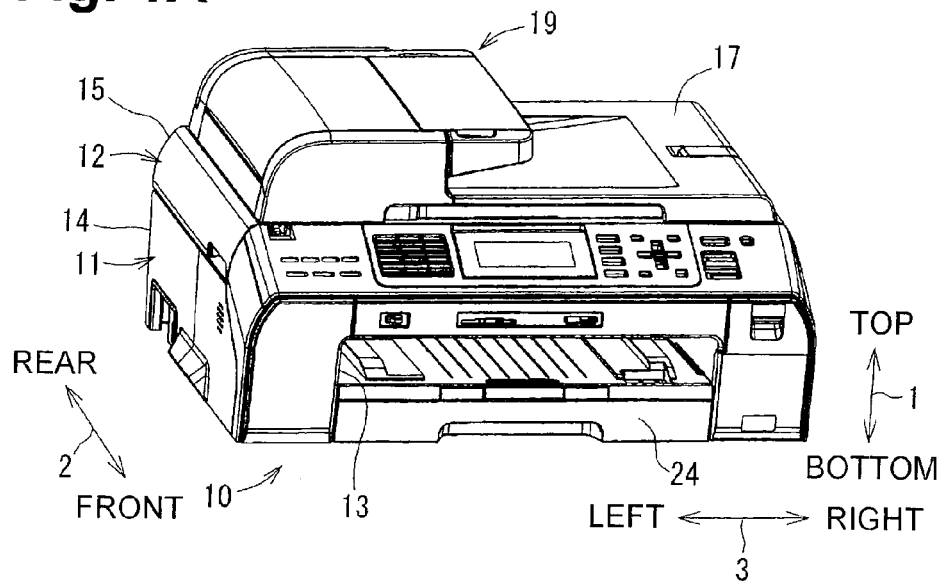
FIG. 1A and FIG. 1B are perspective views showing appearance configurations of a multifunction peripheral 10 according to an embodiment of the present invention.
Figure 1B:
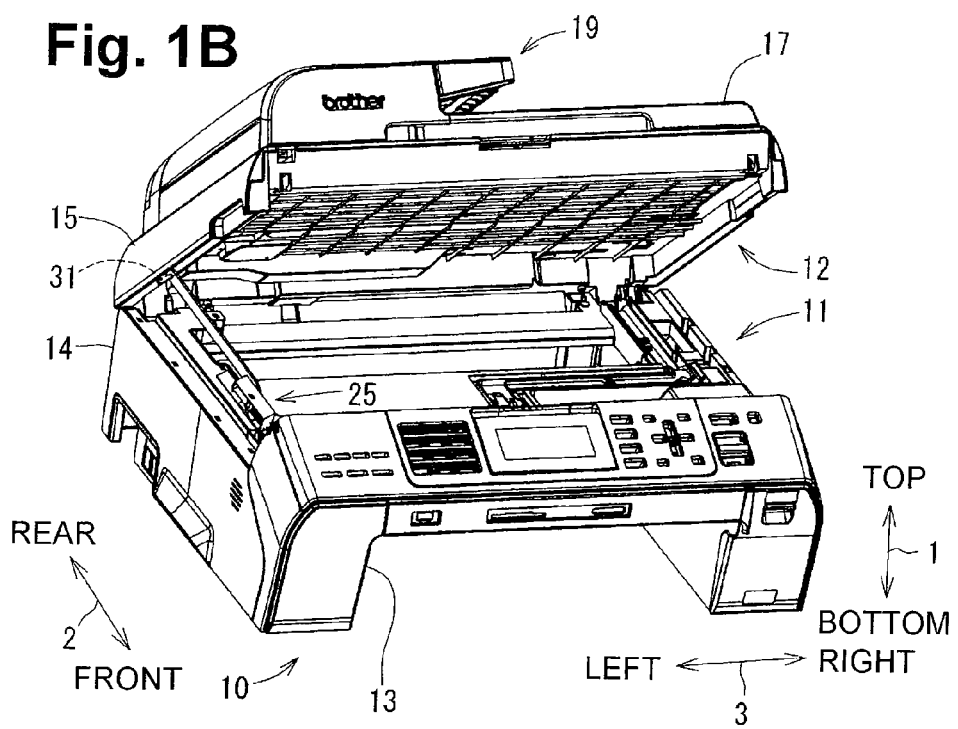

FIG. 1A and FIG. 1B are perspective appearance views of a multifunctional peripheral 10 according to an embodiment of the invention. FIG. 1A shows a state in which a scanner unit 12 (an example of an "upper unit") is closed with respect to a printer unit 11 (an example of a "main body"), and FIG. 1B shows a state in which the scanner unit 12 is opened. Typically, the scanner unit 12 is opened with respect to the printer unit 11 at the time of maintenance of the printer unit 11 or clearance of paper jam.

In this specification, a direction indicated by an arrow 1 is defined as a "vertical direction" with respect to the multifunctional peripheral 10 in use (the state shown in FIG. 1A). A direction indicated by an arrow 2 is defined as a "fore-and-aft direction" and a direction indicated by an arrow 3 is defined as a "lateral direction" assuming that a side where an opening 13 is provided is a near side (front side).

As shown in FIGS. 1A and 1B, the multifunctional peripheral 10 is formed into a substantially parallelepiped shape having a width (a length in the lateral direction 3) and a depth (a length in the fore-and-aft direction 2) larger with respect to a height (a length in the vertical direction 1). The multifunctional peripheral 10 has a variety of functions such as a facsimile function, a printing function, a scanning function, and a copying function. The multifunctional peripheral 10 does not necessarily have to have all these functions, and may be implemented as a printer having only the printing function, and a copying machine having only the copying function.

The printer unit 11 is arranged on a lower portion of the multifunctional peripheral 10. The printer unit 11 is provided with a housing 14, and the opening 13 is formed on a front side of the housing 14. A tray 24 for storing printing papers is mounted in the opening 13. In FIG. 1B, an illustration of the tray 24 is omitted. The printer unit 11 typically employs an ink-jet printing system. However, the printer unit 11 is not limited to the ink-jet printing system, and those of an electrophotographic system or of a thermal transfer system may be employed.

The scanner unit 12 is arranged on an upper side of the printer unit 11. The scanner unit 12 includes a housing 15, and a contact glass, not shown, is installed on an upper surface of the housing 15. A document to be subjected to scanning is placed on an upper surface of the contact glass. The scanner unit 12 includes a document cover 17 configured to open and close the upper surface of the housing 15. By closing the document cover 17 (the state shown in FIG. 1A), the document placed on the contact glass is held by the document cover 17. The document cover 17 is provided with an automatic document feeding device (Auto Document Feeder: ADF) 19. Accordingly, a plurality of the documents is fed onto the contact glass automatically one by one in sequence. The ADF 19 may be omitted.

The scanner unit 12 is openable and closable with respect to the printer unit 11 as shown in FIGS. 1A and 1B via an opening and closing mechanism 25, described later. The characteristics of the multifunctional peripheral according to the embodiment is a structure of the opening and closing mechanism 25, and smooth opening and closing operation of the scanner unit 12 and damping when being closed are achieved by the opening and closing mechanism 25.

[Opening and Closing Mechanism of Scanner Unit (Summary)]

FIG. 2 is a drawing showing a side view of the multifunctional peripheral 10 in a state in which the scanner unit 12 is opened. In FIG. 2, illustration of part of the opening and closing mechanism 25 is omitted.

As shown in FIG. 2, the scanner unit 12 is rotatably supported on a rear back side of the multifunctional peripheral 10 via a rotating shaft 26 (an example of "rotating supporting shaft"). The rotating shaft 26 is arranged at a rear back portion of the housing 14 of the printer unit 11. The housing 15 and the housing 14 are coupled by the rotating shaft 26. Consequently, the scanner unit 12 is allowed to be opened and closed with respect to an upper surface of the printer unit 11 and becomes rotatable between a closed position covering the upper surface (the position shown in FIG. 1A) and an open position upward apart from the upper surface (the position shown in FIG. 1B). When the scanner unit 12 takes the open position, the upper surface of the printer unit 11 is exposed, and hence a user of the multifunctional peripheral 10 is allowed to access to an interior from the upper surface of the printer unit 11.

Figure 3:
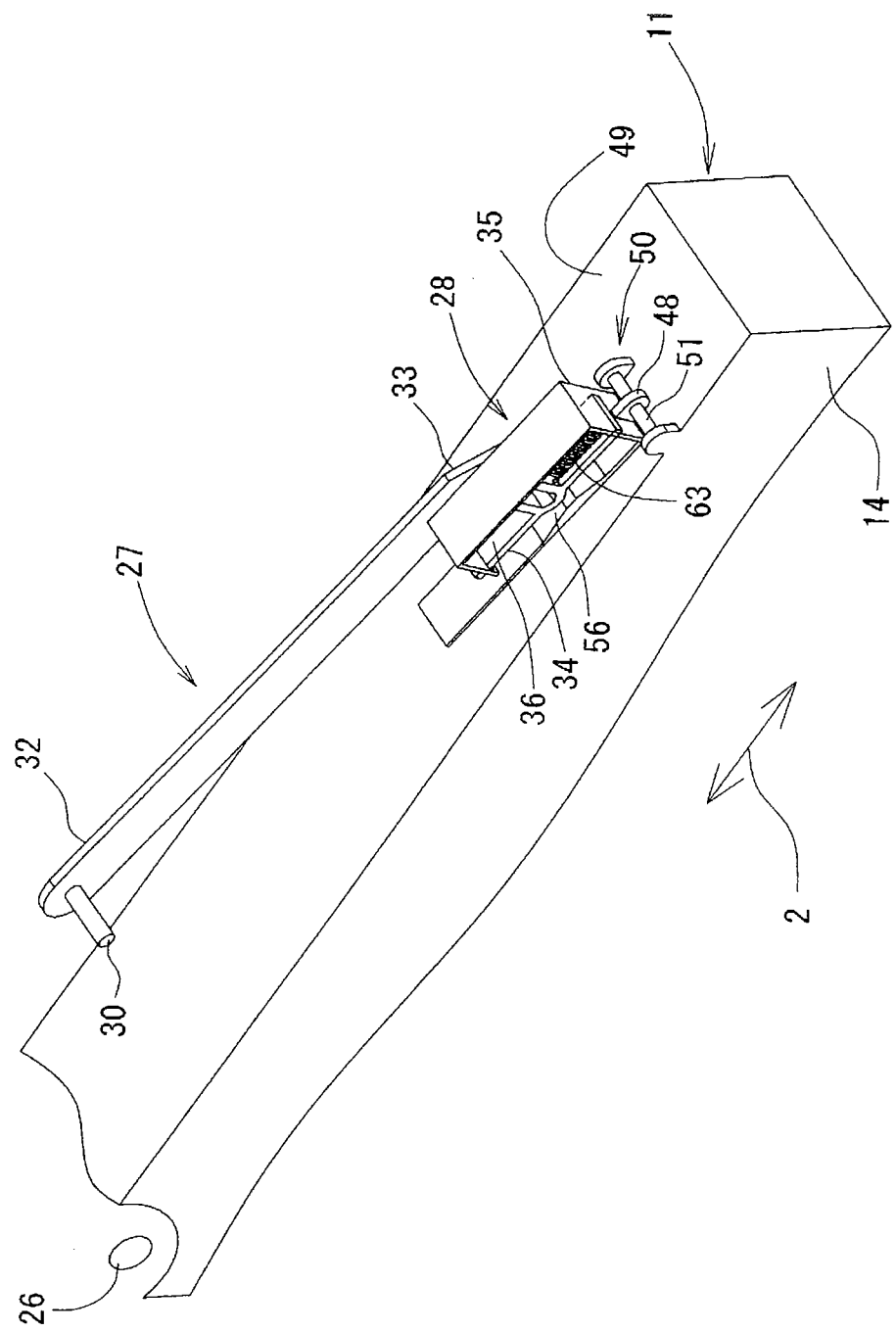
FIG. 3 is an enlarged perspective view of an opening and closing mechanism 25 of the multifunctional peripheral 10.

FIG. 3 is an enlarged perspective view of the opening and closing mechanism 25.

The opening and closing mechanism 25 includes the rotating shaft 26, a connecting rod 27 (an example of "auxiliary arm") configured to couple the scanner unit 12 and the printer unit 11, and a damping unit 28 (an example of "damping unit") interposed between the connecting rod 27 and the printer unit 11. The damping unit 28 alleviates an impact applied when the scanner unit 12 takes the closed position.

[Connecting Rod]

Figure 4:
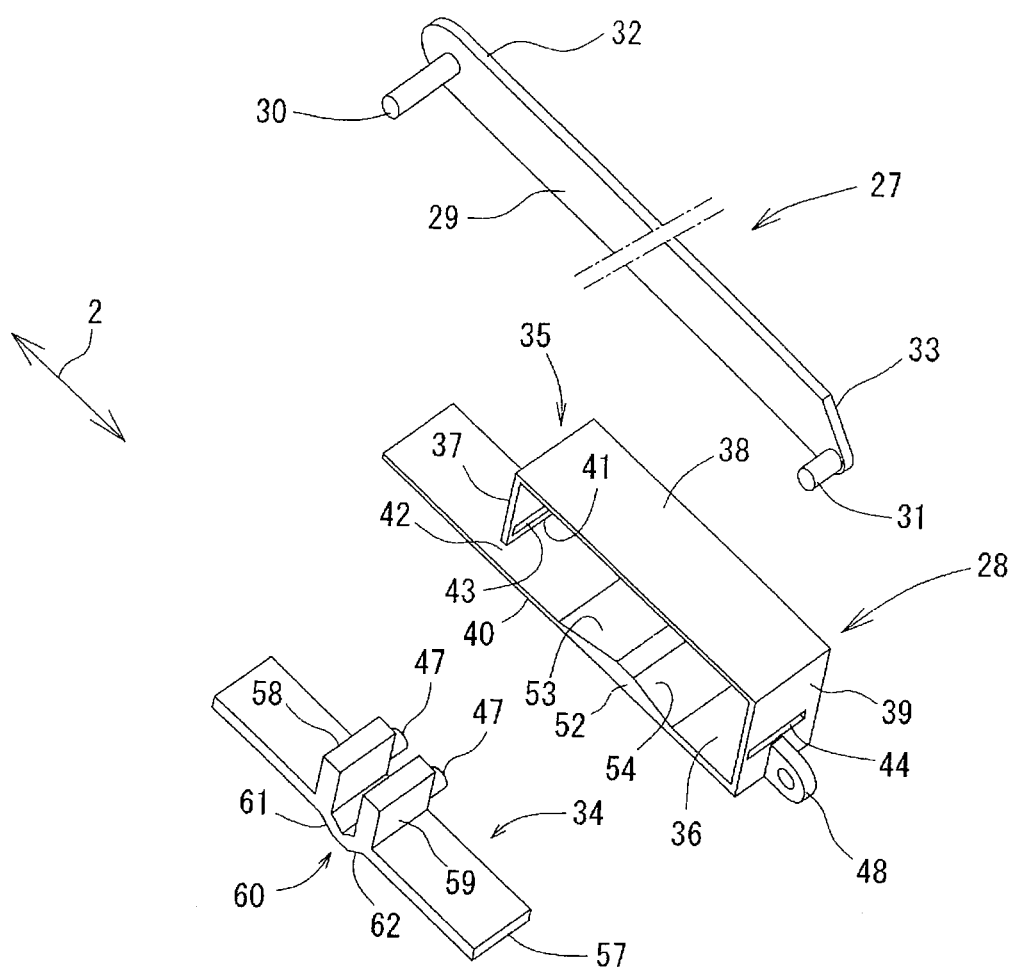
FIG. 4 is an exploded perspective view of a damping unit 28 of the opening and closing mechanism 25.

FIG. 4 is an exploded perspective view of the damping unit 28.

As shown in FIG. 3 and FIG. 4, the connecting rod 27 is formed of an elongated flat panel, and includes a flat panel portion 29, a supporting pin 30, and a slide pin 31 (an example of "slider"). The connecting rod 27 supports the scanner unit 12 when the scanner unit 12 is in the open position, and maintains the open position. The supporting pin 30 projects from a distal end portion 32 (an example of "one end portion") of the connecting rod 27 and is formed into a column shape in the embodiment. The supporting pin 30 rotatably engages the housing 15 of the scanner unit 12 at a predetermined position as shown in FIGS. 1A and 1B. Therefore, the supporting pin 30 moves about the rotating shaft 26 (see FIG. 2) in conjunction with the opening and closing operation of the scanner unit 12. In other words, the supporting pin 30 moves about the rotating shaft 26 along an imaginary arc having a radius of a distance between the rotating shaft 26 and the supporting pin 30.

As shown in FIG. 4, the slide pin 31 projects from a proximal end portion 33 (an example of "other end portion") of the flat panel portion 29. When the scanner unit 12 is opened and closed, the supporting pin 30 moves along the imaginary arc about the rotating shaft 26, and the proximal end portion 33 moves along an upper surface 49 of the printer unit 11. In this embodiment, the slide pin 31 is also formed into a column shape, and projects from the flat panel portion 29 outward of the printer unit 11. The slide pin 31 engages the damping unit 28, and slides as described later with respect to the damping unit 28 when the scanner unit 12 is opened and closed. When the scanner unit 12 is rotated from an open position to a closed position, the slide pin 31 moves from a first position to a second position.

[Damping Unit]

As shown in FIG. 3 and FIG. 4, the damping unit 28 includes a movable member 34 (an example of "movable member"), a holding unit 35 (an example of "holding unit"), and a coil spring 63 (an example of "spring").

The holding unit 35 is formed into a parallelepiped shape, and is formed with a movable member accommodating chamber 36 configured to accommodate the movable member 34 in an interior thereof. Specifically, the holding unit 35 is formed by bending the elongated flat panel, and includes a first panel portion 37, a second panel portion 38, a third panel portion 39, and a fourth panel portion 40. The holding unit 35 may be formed of resin, metal, or the like and typically of resin. The first panel portion 37 to the fourth panel portion 40 continue in sequence as shown in FIG. 4, so that the first panel portion 37 opposes the third panel portion 39, and the second panel portion 38 opposes the fourth panel portion 40. A gap 42 is provided between a distal end 41 of the first panel portion 37 and the fourth panel portion 40. The gap 42 is set so as to allow insertion of the slide pin 31.

The first panel portion 37 and the third panel portion 39 are formed with through holes 43 and 44 in an elongated square shape, respectively. As described later, both end portions of the movable member 34 are fitted to the through holes 43 and 44. As shown in FIG. 4, an outside surface of the holding unit 35 (a near side surface in FIG. 4) is released, and a side panel 45 is provided on an inside surface of the holding unit 35 (see FIG. 2 and FIG. 5C). A groove 46 is provided on the side panel 45, so that engaging pins 47 of the movable member 34 (see FIG. 4) are fitted to the groove 46. The groove 46 is formed by forming an elongated through hole on the side panel 45 in this embodiment. However, the structure of the groove 46 is not specifically limited as long as fitting of the engaging pins 47 is ensured.

A mounting panel 48 is provided on the third panel portion 39 so as to project therefrom. As shown in FIG. 3, the damping unit 28 is attached to the housing 14 of the printer unit 11 via the mounting panel 48. More specifically, an anchor 50 (an example of "stopper") is provided on the upper surface 49 of the housing 14 so as to be projected therefrom. The anchor 50 is formed of a pair of flat panels, and the respective panels are arranged so as to oppose to each other at a predetermined span as shown in FIG. 3. A fixing pin 51 is bridged across the anchor 50. The mounting panel 48 is arranged between the pair of flat panels which constitute the anchor 50, and the fixing pin 51 passes through the mounting panel 48. Therefore, the damping unit 28 is supported by the fixing pin 51 so as to rotate about the fixing pin 51.

As shown in FIG. 4, a center portion 52 of the fourth panel portion 40 is swelled inward (toward the second panel portion 38). Accordingly, gentle inclined surface 53 (an example of a portion of a guide) and gentle inclined surface 54 (an example of a portion of a guide) are formed. As shown in FIG. 5C, a lower end edge 55 (an example of a portion of a guide) of the side panel 45 is notched so as to extend along the inclined surfaces 53 and 54. Therefore, a guide groove 56 of a gentle angled shape is formed by the lower end edge 55 and the fourth panel portion 40. The slide pin 31 is configured to be fitted into the guide groove 56, and the guide groove 56 guides the sliding movement of the slide pin 31. Therefore, the guide groove 56 forms a sliding path of the slide pin 31.

As shown in FIG. 3, the movable member 34 is fitted to the interior of the holding unit 35. As shown in FIG. 4, the movable member 34 includes a substrate 57, ribs 58 and 59 (an example of a portion of an engaging member) formed on an upper surface of the substrate 57 so as to project therefrom, and the engaging pins 47 projecting from a side surface of the substrate 57. In this embodiment, the substrate 57, the ribs 58 and 59, and the engaging pins 47 are integrally formed.

The substrate 57 is a rectangular shaped elongated flat panel. A center portion 60 (an example of "protruding portion" and an example of a portion of an engaging member) of the substrate 57 is bent as shown in FIG. 4, and projected downward. Therefore, the center portion 60 of the substrate 57 includes an inclined surface 61, and an inclined surface 62 in pair, and the inclined surfaces 61 and 62 are inclined in the fore-and-aft direction. Both end portions of the substrate 57 engage the first panel portion 37 and the third panel portion 39 of the holding unit 35. Specifically, both end portions of the substrate 57 are inserted respectively into the through holes 43 and 44, and both end portions can slide with respect to the through holes 43 and 44. As shown in FIG. 5C, the center portion 60 of the substrate 57 enters the guide groove 56. Therefore, if the slide pin 31 slides along the guide groove 56, the slide pin 31 engages with the inclined surface 61 of the center portion 60 at an engaging position. Therefore, if the slide pin 31 engages with the inclined surface 61 and then slides further along the guide groove 56, the movable member 34 also slides by being pushed by the slide pin 31.

The ribs 58 and 59 are arranged on both sides of the center portion 60. The respective ribs 58 and 59 enhance the rigidity of the movable member 34, and the rib 59 constitutes a seat portion of the coil spring 63 as shown in FIG. 3 and FIG. 5C, so that an end portion of the coil spring 63 comes into abutment with the rib 59. Then, the engaging pins 47 are provided respectively on the ribs 58 and 59. In this embodiment, the engaging pins 47 are formed into a column shape and project rightward in the drawing (toward the side panel 45 of the holding unit 35). The engaging pins 47 are fitted into the groove 46 formed on the side panel 45, and are capable of sliding along the direction of the groove 46. In other words, the movable member 34 is allowed to be displaced in the direction of the groove 46 (an example of "predetermined direction") by the sliding movement of the engaging pins 47 along the groove 46.

As shown in FIG. 3, the coil spring 63 (an example of a spring) is inserted between the movable member 34 and the holding unit 35 in a state in which the movable member 34 is fitted into the holding unit 35. More specifically, the coil spring 63 may be a so-called compression coil spring, being placed on the substrate 57 of the movable member 34 and fitted between the rib 59 and the third panel portion 39 of the holding unit 35. The coil spring 63 is simply placed on the substrate 57 or either one of both ends of the coil spring 63 is fixed to the rib 59 or the third panel portion 39 of the holding unit 35. In other words, when the coil spring 63 is assembled between the holding unit 35 and the movable member 34, both ends of the coil spring 63 are not fixed to the rib 59 and the third panel portion 39, respectively.

In FIG. 3 and FIG. 4, when the movable member 34 slides rightward (frontward in FIG. 1), since the guide groove 56 having the slide pin 31 fitted therein is formed into the angled shape, a gap between the guide groove 56 and the movable member 34 becomes smaller than an outer diameter of the slide pin 31. Consequently, the slide pin 31 engages with the inclined surface 61 of the movable member 34, and the coil spring 63 is compressed. The movable member 34 receives a resilient force proportional to a sliding amount of the movable member 34 toward the left (rearward in FIG. 1). The resilient force is applied to the slide pin 31 via the inclined surface 61 of the movable member 34. Then, since the guide groove 56 is formed into the angled shape, the slide pin 31 climbs over the center portion 60 of the movable member 34 when the slide pin 31 slides by a predetermined distance. In other words, a gap larger than the outer diameter of the slide pin 31 is formed between the guide groove 56 and the movable member 34 at a disengaging position, and the slide pin 31 disengages with the inclined surface 61, and the resilient deformation of the coil spring 63 is restored.

A length of the connecting rod 27, a shape of the guide groove 56, and a length of the coil spring 63 (natural length) are determined as follows.

When the scanner unit 12 is closed, the supporting pin 30 moves along the imaginary arc and the slide pin 31 slides rightward in FIG. 3 and FIG. 4 (forward in FIG. 1) as described above. The length of the connecting rod 27 is set to a length which allows the slide pin 31 to engage with the inclined surface 61 of the movable member 34 right before the scanner unit 12 reaches the closed position. The shape of the guide groove 56 is formed to allow release of the engagement between the slide pin 31 and the movable member 34 when the scanner unit 12 reaches the closed position. The length (natural length) of the coil spring 63 is set to allow both ends of the coil spring 63 to come into abutment with the rib 59 and the third panel portion 39 in a state in which the slide pin 31 is in abutment with the inclined surface 61. Therefore, when the scanner unit 12 reaches a position immediately before the closed position, the slide pin 31 engages with the inclined surface 61. With reference to this state, when the scanner unit 12 is displaced further toward the closed position, the coil spring 63 is compressed, so that an abrupt position change of the scanner unit 12 is restrained. In addition, when the scanner unit 12 reaches the closed position, the engagement of the slide pin 31 and the movable member 34 is released, and the natural length of the coil spring 63 is restored.

[Opening and Closing Operation of Scanner Unit]

In this multifunctional peripheral 10, the scanner unit 12 rotates about the rotating shaft 26 as the center of rotation between the open position and the closed position, and performs opening and closing operations with respect to the printer unit 11.

Figure 5A:
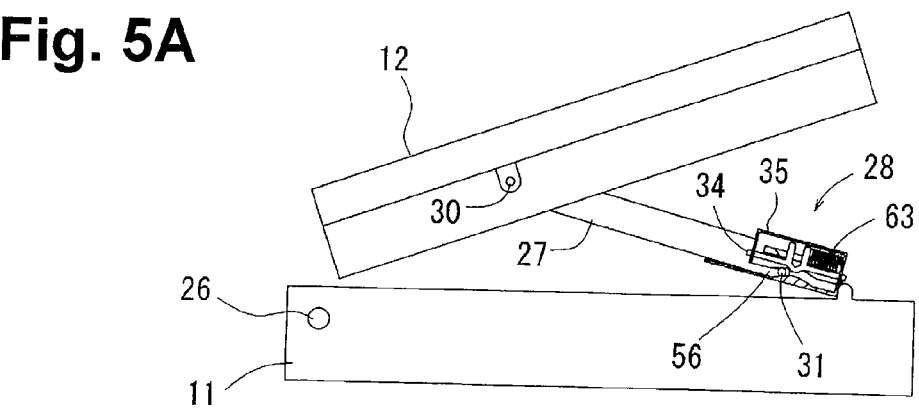
FIGS. 5A to 5C are enlarged views of a principal portion showing an operation when a scanner unit 12 of the multifunctional peripheral 10 is closed.
Figure 5B:
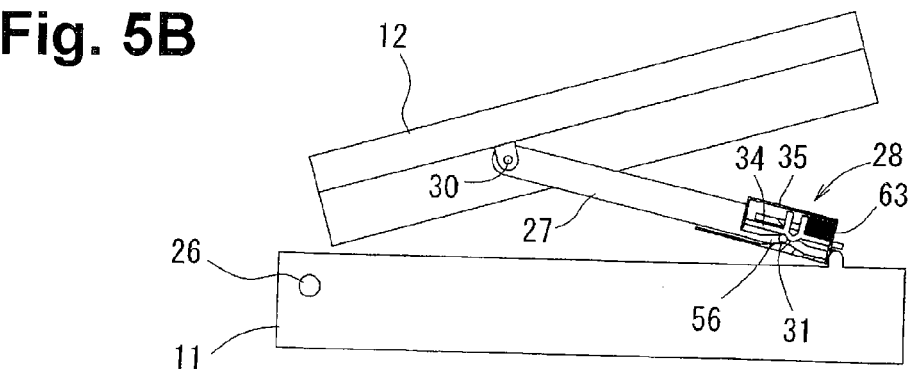
Figure 5C:
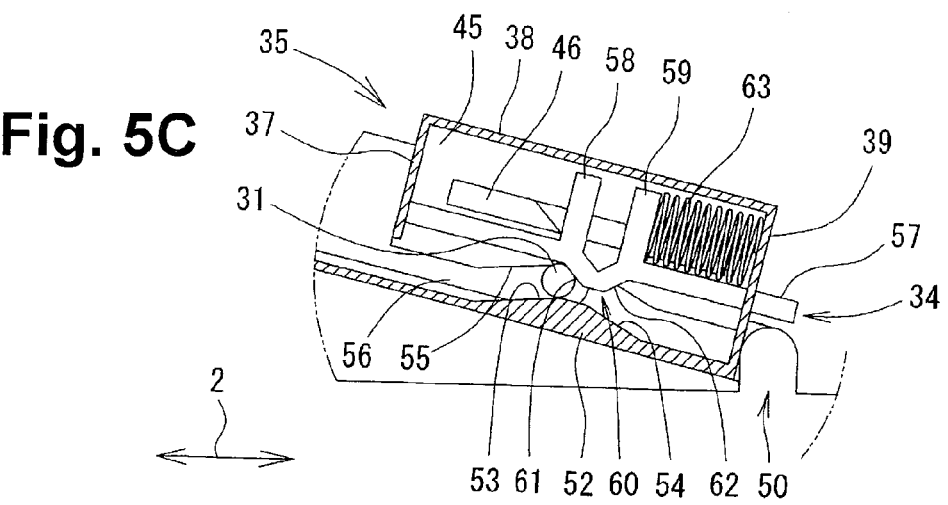
Figure 6A:
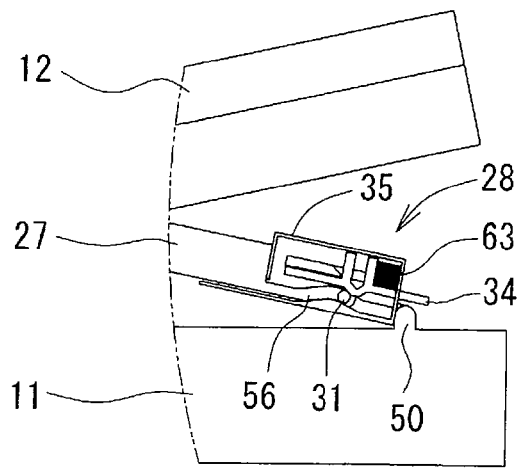
FIGS. 6A to 6C are enlarged views of a principle portion showing an operation when the scanner unit 12 is closed.
Figure 6B:
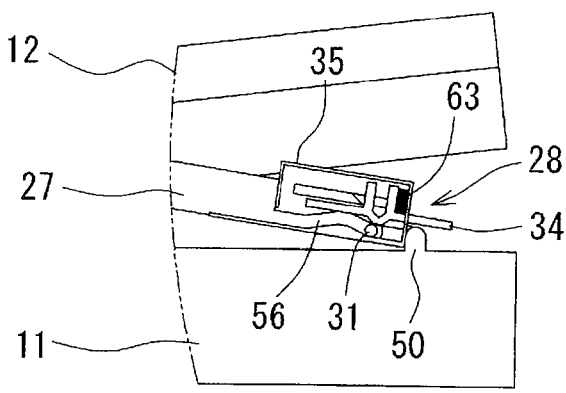
Figure 6C:
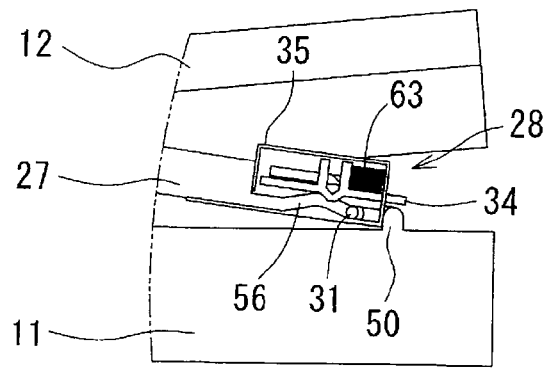
Figure 7A:
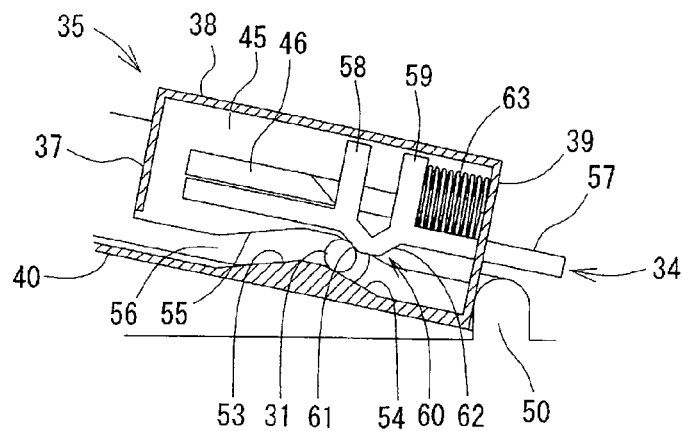
FIGS. 7A to 7C are drawings showing a behavior of the damping unit 28 when the scanner unit 12 is tilted downward.
Figure 7B:
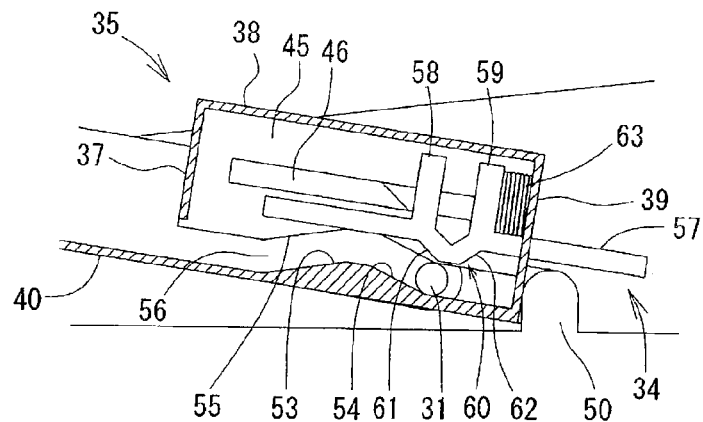
Figure 7C:
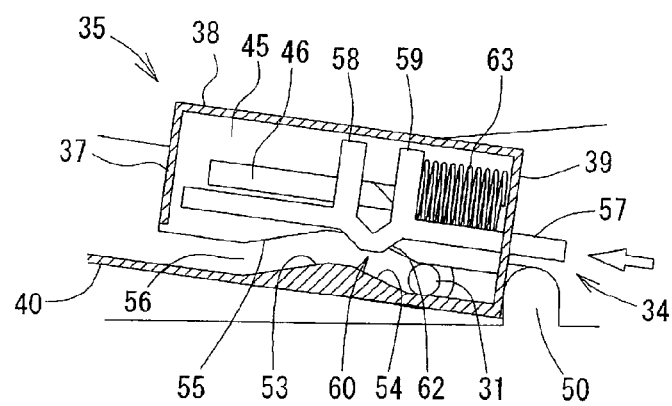

FIGS. 5A to 6C are enlarged views of a principle portion showing an operation performed when the scanner unit 12 is closed. FIGS. 6A to 6C show a tilt-down operation of the scanner unit 12 in sequence, and FIGS. 7A to 7C show behaviors of the damping unit 28 taken when the scanner unit 12 is tilted down. FIGS. 7A to 7C correspond to FIGS. 6A to 6C, respectively.

When the scanner unit 12 is tilted downward from the open position to the closed position, as shown in FIGS. 5A and 5B, the supporting pin 30 also rotates together with the scanner unit 12, and the connecting rod 27 is also tilted down. Therefore, the slide pin 31 provided on the proximal end portion 33 of the connecting rod 27 is displaced stably rightward in the drawing. The damping unit 28 with which the slide pin 31 engages is mounted on the anchor 50 provided on the printer unit 11. Therefore, as shown in FIG. 5C, the slide pin 31 moves rightward in the drawing along the guide groove 56.

When the scanner unit 12 is tilted further downward, the slide pin 31 moves rightward along the inclined surface 53 of the guide groove 56 and engages with the inclined surface 61 of the movable member 34. The movable member 34 is pushed by the slide pin 31 and is slid rightward. When the movable member 34 is slid rightward, the coil spring 63 is resiliently deformed as described above, and the movable member 34 receives the resilient force according to the amount of deformation leftward. In other words, since the slide pin 31 receives the resilient force via the movable member 34, the resilient force acts in a direction to hinder the tilting operation when the scanner unit 12 is tilted downward.

As shown in FIG. 6A and FIG. 7A, when the scanner unit 12 is tilted further downward, the slide pin 31 moves rightward along the inclined surface 53 of the guide groove 56, and moves further along the inclined surface 54. Accordingly, the movable member 34 receives a stronger resilient force leftward. As shown in FIGS. 6B and 7B, when the scanner unit 12 is tilted further downward, the slide pin 31 passes through the inclined surface 54 of the guide groove 56. Accordingly, the coil spring 63 is further compressed. When the scanner unit 12 is tilted further downward, as shown in FIG. 6C, the engagement between the slide pin 31 and the center portion 60 of the movable member 34 is released. In this embodiment, the scanner unit 12 is set to be changed into the closed position immediately after the release of the engagement between the slide pin 31 and the movable member 34. When the engagement between the slide pin 31 and the movable member 34 is released, as shown in FIG. 7C, the compressed coil spring 63 is expanded and the natural length is restored. Simultaneously, the movable member 34 is slid leftward in the drawing by the resilient force of the coil spring 63, and is restored to its original position, that is, to a position where the gap smaller than the outer diameter of the slide pin 31 is formed with respect to the guide groove 56 (see FIG. 5A).

In this manner, when the scanner unit 12 is tilted downward, the resilient force acts to hinder the tilt-down operation.

Therefore, an impact applied when the scanner unit 12 is closed with respect to the printer unit 11 is alleviated, and a smooth change to the closed position is achieved. In addition, since the damping unit 28 which performs the damping as described above has an extremely simple structure, the cost reduction is achieved. In addition, the resilient force is cleared as described above immediately before the scanner unit 12 reaches the closed position. The resilient force does not act when the scanner unit 12 is changed from the closed position to the open position. Therefore, a smooth position change is achieved.

In particular, in the embodiment, since the damping unit 28 is provided with the guide groove 56 (FIG. 5C), the slide pin 31 is smoothly slid along the guide groove 56. Accordingly, the sliding displacement of the slide pin 31 is stabilized, and the resilient force generated when the slide pin 31 is disconnected from the movable member 34 (when the engagement between the slide pin 31 and the damping unit 28 is released) becomes constant (see FIG. 7B). In other words, design to cause the slide pin 31 to be disconnected from the movable member 34 reliably when the scanner unit 12 is in the closed position is easily and advantageously achieved. The guide groove 56 may be omitted, however.

Furthermore, in this embodiment, the slide pin 31 is formed of a round rod, and the slide pin 31 comes into abutment with the inclined surface 61 of the movable member 34 in a line contact state. Therefore, when the movable member 34 is slid and the resilient force of the coil spring 63 is increased to reach or exceeds a certain level, the slide pin 31 climbs over the inclined surface 61 of the movable member 34 and the engagement therebetween is reliably released. In other words, there is an advantage such that when the position of the scanner unit 12 is changed to the closed position, the resilient force is reliably released when the scanner unit 12 reaches the closed position. The shape of the slide pin 31 is not limited to the round rod shape. For example, a configuration such that a distal end portion of the slide pin 31 is formed into a spherical shape and the slide pin 31 comes into abutment with the inclined surface 61 in a point contact state is also applicable. In point of fact, it may be any shape as long as an outer peripheral surface of the slide pin 31 is formed into a protruding curved surface so as to be in line contact or point contact with the inclined surface 61.

First Modification of the Embodiment

Figure 8:
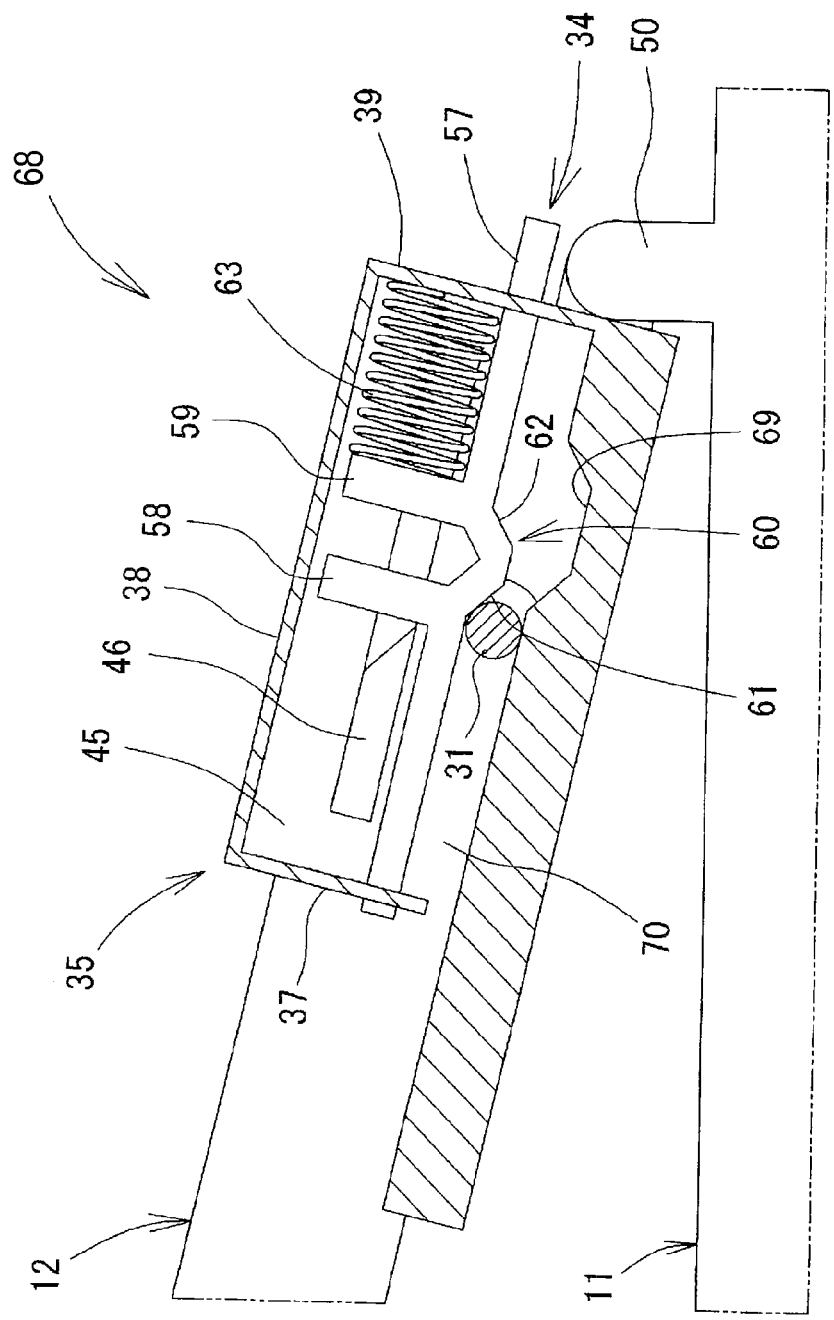
FIG. 8 is an enlarged cross-sectional view of a damping unit 68 according to a first modification of the embodiment.

FIG. 8 is an enlarged cross-sectional view of a damping portion 68 according to a first modification of the embodiment.

A different point of the damping unit 68 according to the first modification from the damping unit 28 according to the embodiment described above resides in that the damping unit 28 is configured in such a manner that the guide groove 56 protruding upward is formed by upraising the center portion 52 (see FIG. 4, FIG. 5C) of the fourth panel portion 40 of the holding unit 35, while in this modification, as shown in FIG. 8, a depressed portion 69 is formed on the fourth panel portion 40 of the holding unit 35, whereby a guide groove 70 protruding downward is formed. Other configurations are the same as the damping unit 28 according to the above-descried embodiment.

In this modification, when the scanner unit 12 is changed to the closed position, the slide pin 31 pushes the movable member 34, whereby the coil spring 63 is deformed. In FIG. 8, when the slide pin 31 moves rightward by a predetermined distance, the slide pin 31 moves downward. Accordingly, a gap larger than the outer diameter of the slide pin 31 is formed between the guide groove 70 and the movable member 34, and the engagement between the slide pin 31 and the inclined surface 61 of the movable member 34 is released. In this modification, the guide groove 70 protruding downward is formed, but the groove for guiding the slide pin 31 may be straight. In this case, a structure in which the movable member 34 moves away from the slide pin 31 is also applicable. In point of fact, what is necessary is that when the movable member 34 is slid by a predetermined distance, a gap larger than the outer diameter of the slide pin 31 is formed between the guide groove 70 (56) and the movable member 34 and the engagement between the movable member 34 and the slide pin 31 is released.

Second Modification of the Embodiment

Figure 9A:
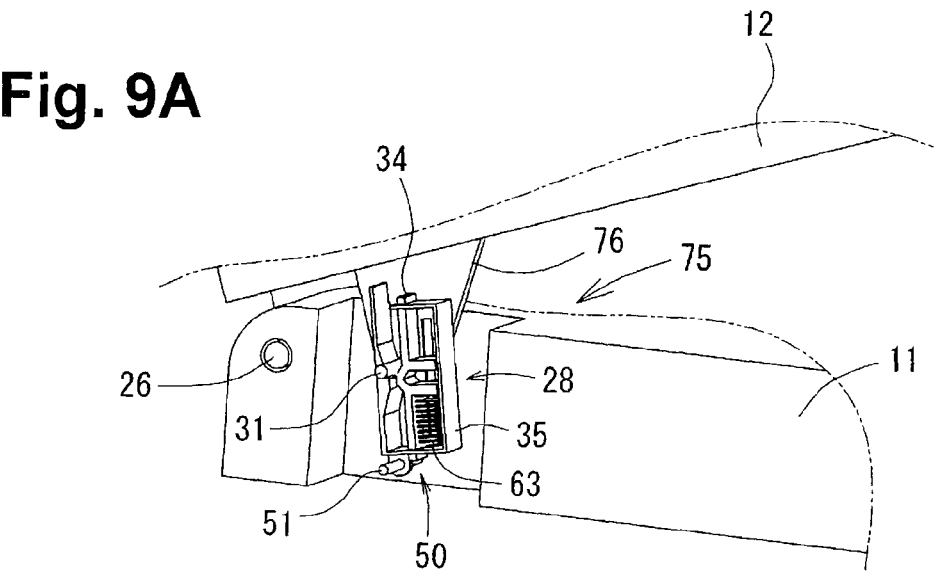
FIGS. 9A and 9B are enlarged views of an opening and closing mechanism 75 according to a second modification of the embodiment.
Figure 9B:
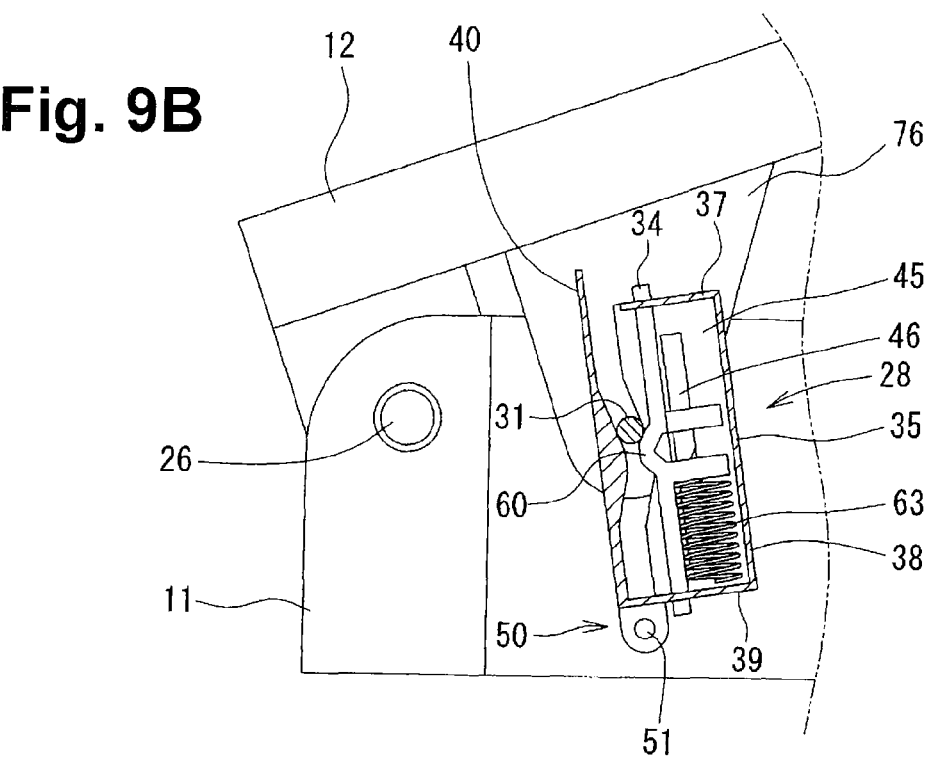

FIGS. 9A and 9B are enlarged views of an opening and closing mechanism 75 according to a second modification of the embodiment. FIG. 9A is a perspective view and FIG. 9B is an enlarged cross-sectional view of a principal portion.

A different point of the opening and closing mechanism 75 in this modification from the opening and closing mechanism 25 according to the above-described embodiment resides in that the elongated panel shaped connecting rod 27 is provided and the damping unit 28 is arranged on a front end portion of the printer unit 11 in the opening and closing mechanism 25 as shown in FIG. 1B and FIG. 5, while the damping unit 28 is arranged at a rear end portion of the printer unit 11, and a projecting strip 76 is provided in the vicinity of the rotating shaft 26 for supporting the scanner unit 12 in this modification. Then, the slide pin 31 is provided at a distal end portion of the projecting strip 76, and the slide pin 31 engages the damping unit 28. Other configurations are the same as the opening and closing mechanism 25 according to the above-described embodiment.

Third Modification of the Embodiment

Figure 10:
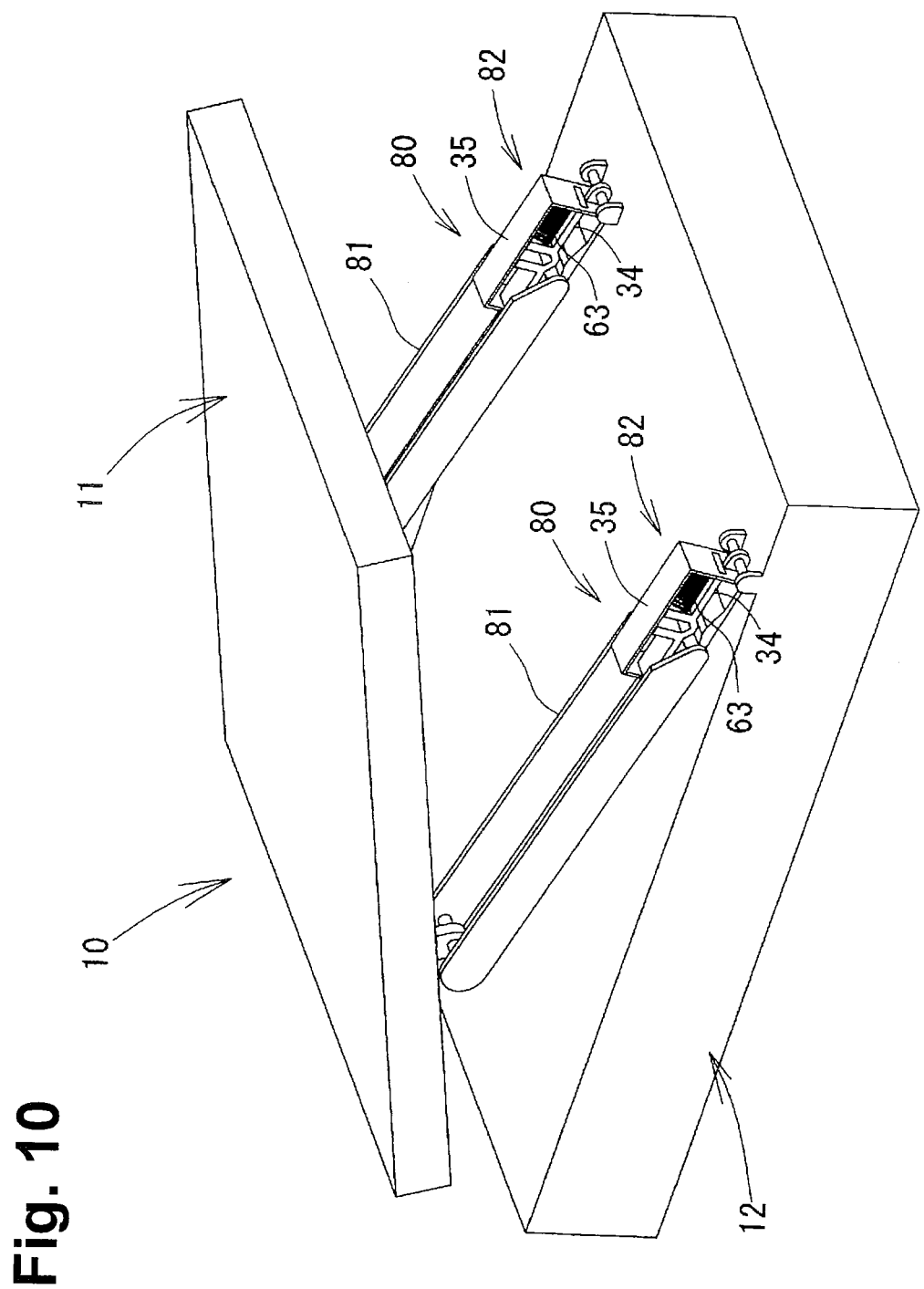
FIG. 10 is a perspective view of an opening and closing mechanism 80 according to a third modification of the embodiment.

FIG. 10 is a perspective view of an opening and closing mechanism 80 according to a third modification of the embodiment. In FIG. 10, the printer unit 11 and the scanner unit 12 are schematically illustrated.

A different point of the opening and closing mechanism 80 in the third modification from the opening and closing mechanism 25 according to the above-described embodiment resides in that the single opening and closing mechanism 25 is provided in the above-described embodiment, while two such the opening and closing mechanisms 80 are provided, and in that a connecting rod 81 is provided with a pair of flat plates in this modification in contrast to the connecting rod 27 coupled to the damping unit 28, which is formed of a single flat panel in the above embodiment. The respective opening and closing mechanisms 80 are arranged at both ends (ends in the lateral direction) of the printer unit 11 and the scanner unit 12. The respective opening and closing mechanisms 80 are provided respectively with damping units 82, and the flat plates which constitute the connecting rod 81 are arranged so as to hold both sides of the respective damping units 82. Other configurations are the same as the opening and closing mechanism 25 according to the above-described embodiment.

In the third modification, even though a weight of the scanner unit 12 is large, smooth opening and closing operation of the scanner unit 12 is enabled.

In the embodiments and respective modifications, a mode in which the scanner unit 12 is opened and closed with respect to the printer unit 11 has been disclosed. However, the invention is not limited thereto, and the opening and closing mechanisms 25, 75, 80 according to the embodiment and the respective modifications may be employed for opening and closing the document cover 17 in the scanner unit 12, for example.

In the embodiments and respective modifications, the coil spring 63 (an example of a spring) is compressed when the scanner unit 12 (an example of an upper unit) is moved from the open position to the closed position. Alternatively, the coil spring 63 can be arranged such that the coil spring 63 is pulled when the scanner unit 12 is moved from the open position to the closed position.

What is claimed is:

1. A multifunctional peripheral comprising:
a main body;
an upper unit arranged on the main body; and
an opening and closing mechanism connected to the upper unit and the main body, such that the upper unit moves between a closed position covering an upper surface of the main body and an open position exposing the upper surface of the main body,
wherein the opening and closing mechanism includes:
a supporting shaft configured to support the upper unit such that the upper unit is rotatable with respect to the main body;
a guide forming a sliding path;
a slider configured to slide between a first position and a second position along the sliding path, such that the slider is in the first position when the upper unit is in the open position and the slider is in the second position when the upper unit is in the closed position; and
a damping unit including an engaging member configured to move in a predetermined direction and a spring configured to resiliently urge the engaging member in a direction opposite to the predetermined direction by a force corresponding to a sliding amount of the engaging member in the predetermined direction;
wherein, during sliding of the slider from the first position to the second position in accordance with a closing operation of the upper unit with respect to the main body, the slider moves from the first position along the sliding path to engage the engaging member at an engaging position on the sliding path and moves the engaging member in the predetermined direction as the slider slides toward the second position, and the slider disengages the engaging member at a disengaging position between the engaging position and the second position such that the slider is released from receiving the force of the spring via the engaging member when the slider is in the second position, wherein the engaging position is located between the first position and the disengaging position.

2. The multifunctional peripheral according to claim 1, wherein the damping unit includes:
a movable member including the engaging member; and
a holding unit configured to slidably support the movable member,
wherein the spring is disposed in the holding unit and is configured to resiliently urge the movable member in the direction opposite to the predetermined direction.

3. The multifunctional peripheral according to claim 1, wherein the guide has a groove configured to guide the slider along the predetermined direction.

4. The multifunctional peripheral according to claim 1, wherein the guide includes an inclined surface on which an outer peripheral surface of the slider slides.

5. The multifunctional peripheral according to claim 1, comprising an auxiliary arm having a first end portion and a second end portion, the first end portion being rotatably connected to the upper unit, the second end portion including the slider.

6. The multifunctional peripheral according to claim 1, further comprising a stopper which restricts movement of the damping unit.

7. The multifunctional peripheral according to claim 1, wherein the engaging member includes a protruding portion which protrudes into the sliding path.

8. The multifunctional peripheral according to claim 7, wherein:
when the slider is in the engaging position, a distance between the protruding portion and the guide inhibits the slider from passing therebetween; and
when the slider is in the disengaging position, a distance between the protruding portion and the guide allows the slider to pass therebetween.

9. The multifunctional peripheral according to claim 1, wherein the damping unit includes the guide.

10. The multifunctional peripheral according to claim 1, wherein the main body includes a printer unit which prints an image on a recording sheet.

11. The multifunctional peripheral according to claim 1, wherein the upper unit includes a scanner unit which reads an image on a document.

12. The multifunctional peripheral according to claim 1, wherein the spring includes a coil spring.

13. The multifunctional peripheral according to claim 1, wherein a side of the guide opposing the engaging member includes an upwardly inclined portion, a central portion and a downwardly inclined portion from the first position to the second position.

14. The multifunction peripheral according to claim 13, wherein the slider while engaged with the engaging member during sliding contacts the central portion and downwardly inclined portion of the guide.

15. The multifunction peripheral according to claim 14, wherein the slider becomes disengaged from the engaging member at the disengaging position while sliding along the downwardly inclined portion of the guide.

* * * * *